Sept. 22, 1931. G. R. GALBRAITH 1,823,892
INSECT TRAP
Filed Jan. 27, 1930
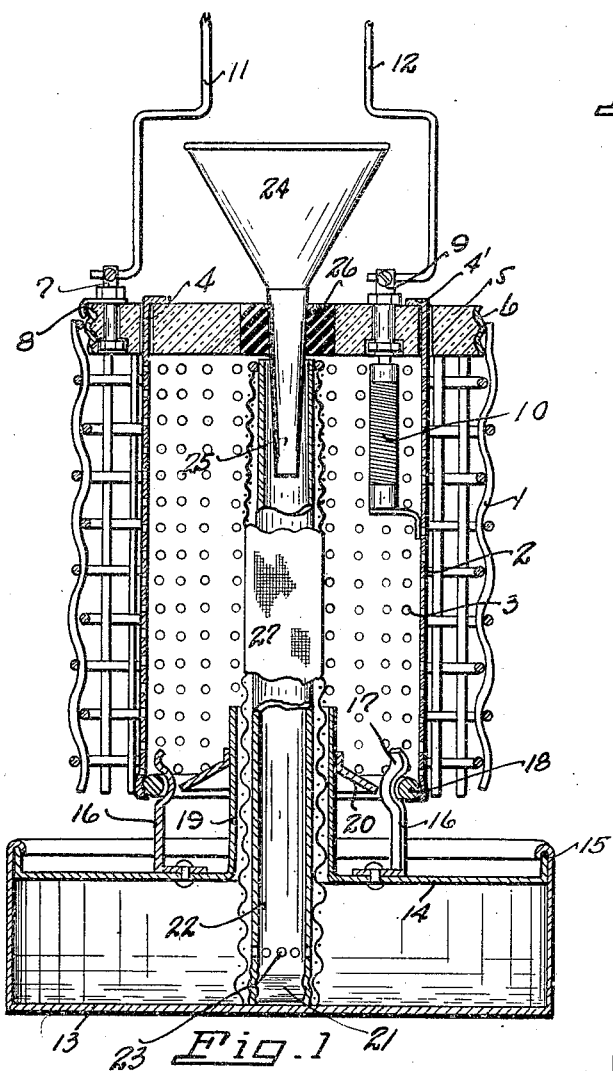
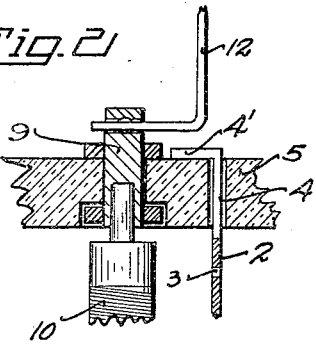
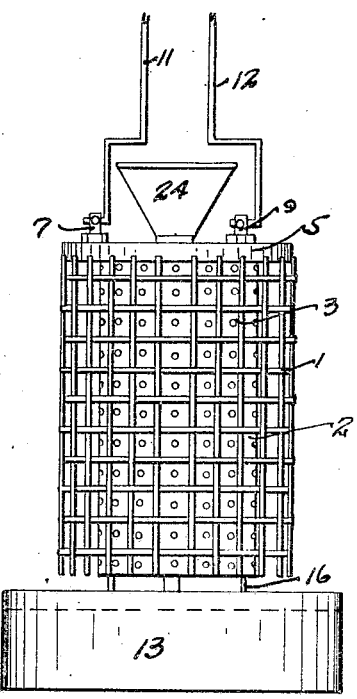
GEORGE R. GALBRAITH
Inventor
By Herbert E. Smith
Attorney Patented Sept. 22, 1931

1,823,892

UNITED STATES PATENT OFFICE

GEORGE R. GALBRAITH, OF BREWSTER, WASHINGTON

INSECT TRAP

Application filed January 27, 1930. Serial No. 423,611.

My present invention relates to an improved insect trap of the electrocuting type, and designed especially for use in fruit orchards and other places, where the traps are suspended in suitable numbers, in the air, either by the lead wires from the source of electrical supply, or by other overhead supports. By the use of the trap of my invention, the insects, or other pests, are electrocuted as they are trapped, and come in contact with two electrodes that form the trap, to produce the electrocuting shock for annihilating the insects or other pests. A collection receptacle is provided into which the electrocuted insects fall from the trap, in order that an inspection may be made of the collected bodies, for identification, to ascertain the approximate number of different insects, and for acquiring other data or information of value to the orchardist.

In carrying out my invention I utilize an odorous, volatile, liquid or fluid bait, which will slowly evaporate, and from which odorous fumes emanate that are calculated to attract the insects to the trap. Means are provided for replenishing the supply of bait, from time to time, as the bait evaporates, and at these times the accumulated electrocuted insects are gathered for inspection.

The invention consists in certain novel combinations and arrangements of parts whereby a compactly built trap is produced, which is simple in construction, and which may be manufactured at a comparatively low cost of production, and which is efficient in the performance of its functions.

Figure 1 is a vertical sectional view of a trap involving my present invention. Figure 2 is an enlarged detail sectional view showing one of the terminals for an electrode of the trap, with a resistance coil as one of the conductors. Figure 3 is an exterior view in elevation of the trap.
In the preferred form of my invention I utilize an outer, reticulated cylinder 1 and a concentric, spaced, inner, perforated cylinder 2, the latter having holes 3 therein to permit passage of the bait-fumes in order that they will be disseminated through the surrounding atmosphere.

The space between the two concentric cylinders which form the two electrodes, is open at the bottom to permit the insects to enter, and this annular space is sufficiently narrow to insure that the insect will contact simultaneously with both electrodes to provide the electrocuting shock.

At its upper end the metallic cylinder 2 is fashioned with suspending straps or tongues 4 that are passed up through vertically arranged holes in a flat cap-block 5 of insulating material, and the ends of these tongues or fingers are turned down at 4' to secure them to the cap-block.

The outer cylinder is also supported from the cap-block or head-block 5, and for this purpose the reticulated cylinder is provided with a top ring or screw band 6 that is threaded on complementary exterior threads of the circular block 5.

On the block are supported the terminals for the electrodes, the terminal 7 being connected by conductor 8 to the recticulated cylinder 1, and the terminal 9 being connected by a conductor, in the form of a resistance coil 10 to the inner cylinder 2. The coil 10 is designed and used as a safety device to prevent excessive heating of the electrodes. The usual lead wires 11 and 12 are connected from the terminals to a suitable source of supply for the electricity used to electrocute the insects, and the usual switch and other accessories are employed to complete the electrical system.

A liquid or fluid bait that will evaporate and give forth fumes or odors, to attract the insects, is contained in a reservoir 13 supported beneath the trap, and the top 14 of this reservoir, which is fashioned with an upper flange 15 forms the collection receptacle into which the electrocuted insects drop from the trap and are gathered for the described purposes.

The reservoir is suspended from the inner cylinder 2 of the trap by means of a plurality of spring detents 16, riveted or otherwise secured to the top of the reservoir, and at their upper free ends these detents are fashioned with hooks 17 that frictionally engage a suspending ring 18, preferably of non-conducting or insulating material. The ring is rigidly fixed to the inner face of the cylinder at its lower edge, as best seen in Figure 1.

The top of the reservoir is fashioned with a central tubular stem 19 that projects upwardly into the inner cylinder and terminates above the bottom of the cylinder, and this stem has an encircling conical or tapered plate 20, which, together with the ring 18, and the tubular stem, effectually closes the bottom of the cylinder against entrance of insects therethrough.

Within the reservoir, a central, threaded boss 21 is fastened to the reservoir-bottom, and a stand pipe 22 is threaded on the boss, said pipe being of a length to extend up to and terminate at the underside of the head block.

Near the bottom of the pipe, holes or outlet ports 23 are provided, and the reservoir may be filled with the liquid bait through these ports by the use of a funnel 24 which is located above the head block and has its stem 25 secured in a socket block 26 at the center of the head-block.

It will be apparent that the liquid bait is poured through the funnel, and the reservoir filled to the required capacity as the liquid passes down the pipe and through the ports to the interior of the reservoir.

To assist in the dissemination of the fumes from the evaporating liquid I utilize a tubular wick 27 that surrounds the stand pipe, and extends down between the pipe and the tubular stem 19, to the bottom of the reservoir. By capillary attraction the liquid bait rises in the meshes of the tubular wick and the bait, or the odors from the bait are disseminated into the inner cylinder, through its perforated wall, and out to the atmosphere through the reticulated cylinder or outer trap member 1.

Having thus fully described my invention, what I claim as new and desire to secure by Letters Patent is:—

1. The combination with an insect trap, of a bait-reservoir suspended therebeneath, said reservoir having a closed top and an annular exterior on the top forming a collection receptacle, means for suspending the reservoir below the trap, means supported on the reservoir for closing the central, lower, open end of the trap, and means for filling the reservoir with bait.

2. The combination with an electrocuting insect trap, of a lower bait reservoir having a closed flanged top forming a collection receptacle, supporting detents on the top fixed to the lower end of the trap, a stand pipe having ports within the reservoir and extending up into the trap and means for filling the reservoir through said pipe, and a capillary wick surrounding said stand pipe.

3. The combination with an electrocuting insect trap, of a lower bait reservoir and means for suspending it from the trap, a stand pipe having ports within the reservoir, rigid with the reservoir and projecting upwardly into the trap, means for filling the reservoir through said pipe, a tubular stem on the reservoir surrounding part of the pipe, and a tubular, capillary wick surrounding said pipe.

4. The combination with an electrocuting insect trap, of a reservoir suspended therefrom and forming a collection receptacle, a stand pipe having ports and secured in the reservoir, a tubular stem on the reservoir surrounding part of the pipe, a tapered closure plate surrounding the stem, and a tubulary, capillary wick surrounding the pipe.

In testimony whereof I affix my signature.

GEORGE R. GALBRAITH